July 10, 1928.                                                1,676,526
J. B. COX
LOW TIRE PRESSURE SIGNAL
Filed Feb. 3, 1927

Joseph B. Cox, Inventor

Patented July 10, 1928.

1,676,526

UNITED STATES PATENT OFFICE.

JOSEPH B. COX, OF TULARE, CALIFORNIA.

LOW-TIRE-PRESSURE SIGNAL.

Application filed February 3, 1927. Serial No. 165,718.

This invention relates to signal devices and pertains particularly to an alarm device for indicating excessive low pressure in a pneumatic tire.

The primary object of this invention is to provide, in a manner as hereinafter set forth, a device designed to be attached to a pneumatic tire valve stem to give a warning, as by the sounding of a whistle, when the pressure within the tire drops below a predetermined number of pounds, so that additional air may be put into the tire befor the same becomes damaged.

The invention broadly contemplates the provision of a tubular casing having one end provided with internal screw threads so that it may be threaded upon the valve stem, after the usual valve inside has been removed. An auxiliary valve body is carried by the casing by which air can be forced into the casing and through the valve and an apertured partition within the casing is normally closed by a valve element forced thereagainst by the pressure of the air withing the tire and valve stem, which valve element is also acted upon by a spring member which acts to shift the same when the air pressure drops to a point where its power upon the valve element is less than the power exerted thereon by the spring, allowing air to pass through the partition to act upon a whistle member through which it discharges.

Another and final object of this invention is to provide a signal of the above described character which will not require a great amount of space and which will be light enough to be carried entirely by the valve stem without damaging the same.

Numerous other objects and advantages of the invention will become apparent as the description of the same proceeds, and the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention, as expressed in the appended claim.

Figure 1:
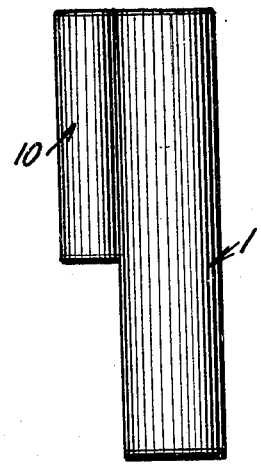
Figure 1 shows the device embodying this invention in side elevation.
Figure 2:
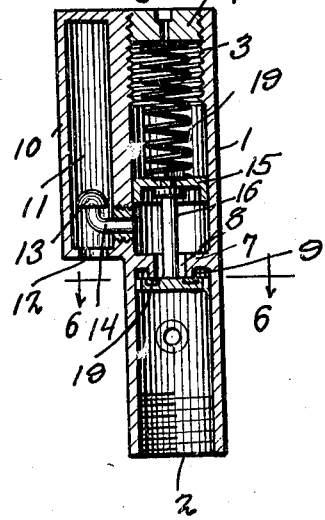
Figure 2 is a central longitudinal section of the signal.
Figure 3:
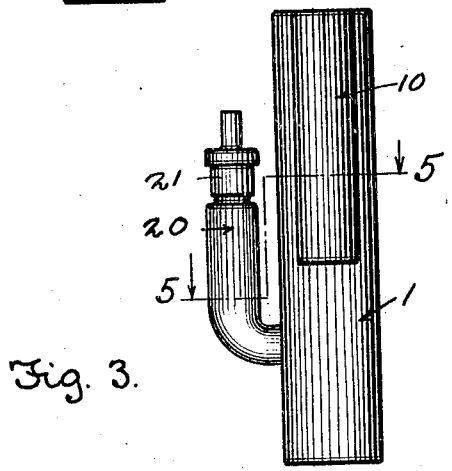
Figure 3 shows the signal in elevation, the view being taken from the left side of the device as shown in Figure 1.
Figure 4:
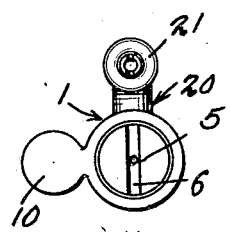
Figure 4 is a top plan view of the signal device.
Figure 5:
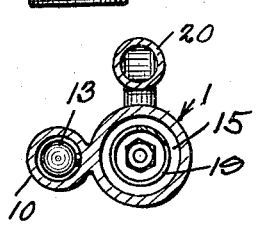
Figure 5 is a section taken upon the line 5—5 of Figure 3.
Figure 6:
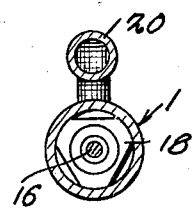
Figure 6 is a section taken upon the line 6—6 of Figure 2.

Referring now to the drawing, in detail, wherein like numerals of reference indicate corresponding parts throughout the several views, the signal structure embodying this invention consists of an elongated tubular casing 1 having each end open and interiorly threaded as indicated by the numerals 2 and 3. The end having the threads 2 formed therein is the lower end of the device and the upper end is normally closed by the screw plug 4 which has a central aperture formed therethrough as indicated at 5 and further has a screw slot 6 formed transversely of the outer face. Within the body 1 intermediate the ends thereof is formed a partition 7 having the central aperture 8 therethrough and further having upon the under face the annular rib 9 which is of the same interior diameter as the aperture 8.

Formed upon the side of the body 1 is a cylinder body 10 which is of substantially half the length of the body upon which it is carried, the cylinder being hollow throughout its length forming the chamber 11, and opening through the bottom as indicated at 12.

Within the chamber 11 a whistle device 13 is positioned having the air tubing 14 leading through the wall of the body 1 and opening into the interior of the same above the partition 7.

Within the body 1 above the partition 7 a piston head is snugly fitted as indicated at 15, having the stem 16 extending downwardly therefrom and through the aperture 8 and upon the lower end of the stem 16 a triangular valve head 18 is carried, the upper face of this head having packing 19 which bears against the rib 9 under certain conditions, to close the aperture 7. As will be readily understood, the valve permits air to pass when the piston is lowered, due to the triangular formation of the valve head.

Resting upon the top of the piston 15 is a coil spring 19 which is held in position and tensioned by the screw plug 4.

Opening through the wall of the body 1 beneath the partition 7 is an auxiliary valve stem 20 having the usual cover cap 21 thereon and in this stem a valve inside of the usual structure (not shown) may be fitted to control the air within the tube, in the usual well known manner.

When the signal device is put into use, the inside structure of the inner tube valve stem is removed and the lower end of the body 1 is threaded upon the valve stem. Air is then introduced into the tire through the auxiliary stem 20, the plug body 4 having been previously adjusted to cause the spring 19 to bear against the piston 15 with a predetermined force. When the pressure of air within the tire exceeds the pressure exerted by the spring 19 upon the piston 15, the piston will be caused to move upwardly by the air pressure to close the passage 8 by the valve head 18. From this it will be readily understood that the pressure within the tire falls to the point where the spring 19 exerts the greater force, the piston 15 will be pressed downwardly and the air escaping from the tube will cause the signal to be sounded by the whistle 13.

When the pressure continues to drop the spring 19 will move the piston 15 sufficiently for it to close the whistle tube 14 and thus prevent the complete exhaustion of air from the tire. Thus it will be seen that the operator need not immediately stop to repair or replace the valve.

Having thus described my invention, what I claim is:

A pneumatic tire low pressure signal of the character described, comprising an elongated tubular body adapted to be threaded at one end upon a tire valve stem and having its other end closed, said body being provided intermediate its ends with a centrally apertured partition and further having a lateral opening formed through the wall thereof between the partition and said closed end, a valve head upon each end of said stem, one of said heads being designed to close the aperture of said partition, and further being formed to permit air to pass between its edge and the adjacent wall of the tubular body, a resilient body arranged within the tubular body having one end bearing against the closed end thereof with its other end bearing against the adjacent valve head, and an air operated signal arranged to receive air from said lateral opening of the tubular body substantially as and for the purpose described, said valve head having the resilient member bearing thereagainst being designed to close the lateral opening upon the fall of the air pressure below a predetermined point, the closed end of said tubular body comprising a plug body threaded into the tubular body and adapted to be adjusted therein to regulate the tension of said resilient member.

In testimony whereof I affix my signature.

JOSEPH B. COX.